US007288738B2

(12) United States Patent
Patel

(10) Patent No.: US 7,288,738 B2
(45) Date of Patent: Oct. 30, 2007

(54) LASER BRUTING MACHINE

(75) Inventor: Arvindbhai Lavjibhai Patel, Gujarat (IN)

(73) Assignee: Arvindbhai Patel, Gujarat (IN)

( * ) Notice: Subject to any disclaimer, the term of this patent is extended or adjusted under 35 U.S.C. 154(b) by 267 days.

(21) Appl. No.: 10/522,534

(22) PCT Filed: Jul. 18, 2003

(86) PCT No.: PCT/IN03/00245

§ 371 (c)(1),
(2), (4) Date: Jan. 27, 2005

(87) PCT Pub. No.: WO2004/105999

PCT Pub. Date: Dec. 9, 2004

(65) Prior Publication Data

US 2006/0070982 A1    Apr. 6, 2006

(30) Foreign Application Priority Data

May 30, 2003    (IN) .................................... 550/03

(51) Int. Cl.
*B23K 26/36* (2006.01)
*B23K 26/40* (2006.01)
*B23K 26/03* (2006.01)

(52) U.S. Cl. .................... 219/121.68; 219/121.73; 219/121.82; 219/159

(58) Field of Classification Search ............... 219/121.67–121.72, 121–82, 159, 121.73
See application file for complete search history.

(56) References Cited

U.S. PATENT DOCUMENTS 3,289,029 A  * 11/1966  Webb ....................... 314/61
3,610,756 A  * 10/1971  Lenzen et al. ............. 356/30
3,782,828 A  *  1/1974  Alfano et al. ............. 356/318
4,426,893 A  *  1/1984  Miller ....................... 76/1
4,467,172 A  *  8/1984  Ehrenwald et al. .... 219/121.68
4,889,998 A  * 12/1989  Hayano et al. ......... 250/559.41

(Continued)

FOREIGN PATENT DOCUMENTS

JP        410209353 A  *  8/1998

(Continued)

*Primary Examiner*—Samuel M. Heinrich
(74) *Attorney, Agent, or Firm*—Roylance, Abrams, Berdo & Goodman, L.L.P.

(57) ABSTRACT

A laser bruting machine has three sections: (i) a diamond holder, (ii) a set up device and (iii) a processing device. The diamond holder includes a rough diamond, a stitching die and a magnetic die. The rough diamond stone to be centered and bruted is stitched on top of the stitching die by adhesive and heat. The stitching die is then fixed on top of the magnetic die. The setup device includes a computer numerical control (CNC) interface and video system. The diamond to be centered, and hence the diamond holder, is put vertically on motorized rotatable platform. After completion of centering the diamond, the diamond holder is carried to a processing device and fixed horizontally on a motorized rotatable platform of the processing device. The processing device includes a CNC interface, a heat exchanger, a video system, a beam delivery mechanism, a laser source, an RF-Q switch driver, a power supply and a stabilizer. The beam delivery mechanism of the processing device includes (i) a bruting process system and (ii) a girdle polishing system. With standard software, the computer suggests an optimal cut to provide an accurate rounded shape of the diamond by taking the dimensions the shape of the diamond into account.

24 Claims, 16 Drawing Sheets

U.S. PATENT DOCUMENTS

| | | | |
|---|---|---|---|
| 5,190,024 A | | 3/1993 | Senanayake |
| 5,510,891 A | * | 4/1996 | Frangie .................... 356/30 |
| 5,742,627 A | * | 4/1998 | Morita et al. ............... 372/34 |
| 5,932,119 A | * | 8/1999 | Kaplan et al. ......... 219/121.68 |
| 6,130,404 A | * | 10/2000 | Campagna et al. .... 219/121.69 |
| 6,203,644 B1 | * | 3/2001 | Nagaura et al. ............ 156/153 |
| 6,211,485 B1 | * | 4/2001 | Burgess .................. 219/121.7 |
| 6,355,401 B1 | * | 3/2002 | Graves et al. .............. 430/319 |
| 6,405,562 B1 | * | 6/2002 | Zimet et al. .................... 63/32 |
| 6,476,351 B1 | * | 11/2002 | Kaplan et al. ......... 219/121.69 |

FOREIGN PATENT DOCUMENTS

RU            2042478 C1  *  8/1995

* cited by examiner

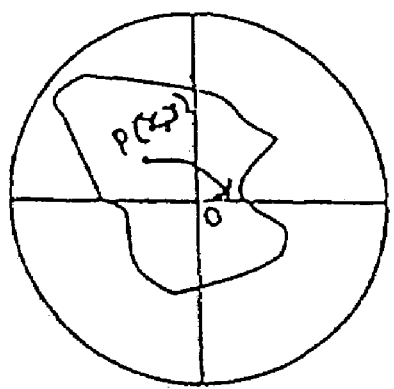
Fig. 16a
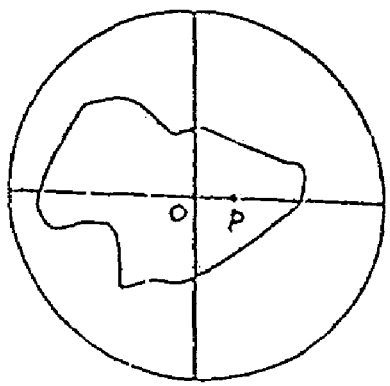
Fig. 16b
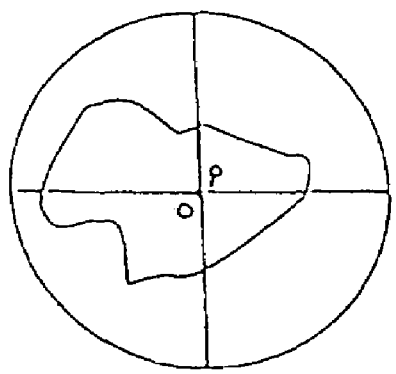
Fig. 16c
Fig. 16

… (1)

LASER BRUTING MACHINE

TECHNICAL FIELD

The present invention relates to a laser bruting machine.

The diamond has always exercised an irresistible seductive power and acquired an almost mythical frame because it is the most expensive of gems and the hardest of all minerals. Each diamond stone must therefore be studied in detail in order to determine the most advantageous manner to work it with the least loss of weight. In its unpolished form, a diamond is a rather vague crystal form, without any real luster. Only a succession of processes, such as marking, cleaving, sawing, girdling, and so forth, gives it its final facet form and brilliance. Girdling is the rounding of the base of sawn (or cleaved) piece so that it has more or less the form of a polished diamond. In conventional machines to achieve girdling of rough diamond stone, the sawn diamond is mounted on the chuck of a lathe and the desired rounded form is achieved by turning it against another diamond, as the cutting tool. The excess surface of the rough diamond cut with the conventional machine is imprecise. The conventional bruting machine works with lower speed and has the high weight loss. This is due to the cutting force spreading to other parts of the diamond. As each diamond is unique it has become imperative to develop new techniques to improve the productivity of the diamond industry.

BACKGROUND ART

A laser bruting machine according to exemplary embodiments of the present invention overcomes the above limitations experienced by conventional bruting machines. With a laser bruting machine according to exemplary embodiments of the present invention, bruting becomes a non-contact, very fast process compared to conventional bruting machines. The laser bruting of exemplary embodiments of the present invention is a non-contact process that gives more speed, reduces weight loss significantly and keeps the shape of diamond uniform. In a laser bruting machine according to exemplary embodiments of the present invention, the computer becomes an important element in cutting the diamond. With the standard software, the computer suggests an optimal cut to have accurate rounded shape of the diamond in which dimensions and shape are taken into account. Also the rough diamond stone to be centered and bruted is lit up by illuminating sources and these illuminating sources consist of a plurality of LED's so the eye gets the impression that is always the same side of the stone that is lit and hence the illuminated rough diamond may be watched on closed-circuit television (CCTV) through a video system including charged-couple device (CDD) cameras. This is a useful technique, because a bruting machine according to exemplary embodiments of the present invention may check the process at all times without stopping the machine. Summing up all the advantages, productivity increases considerably with a laser bruting machine according to exemplary embodiments of the present invention.

BRIEF DESCRIPTION OF THE DRAWINGS

The present invention will be described with greater specific and clarity with reference to following drawings:

FIG. 16a represents a random/initial position of a rough diamond stone.

FIG. 16b represents a position of a center of a rough diamond stone on an X-axis.

FIG. 16c represents a position of a rough diamond stone when it is centered.

DETAILED DESCRIPTION OF EXEMPLARY EMBODIMENTS

Figure 1:
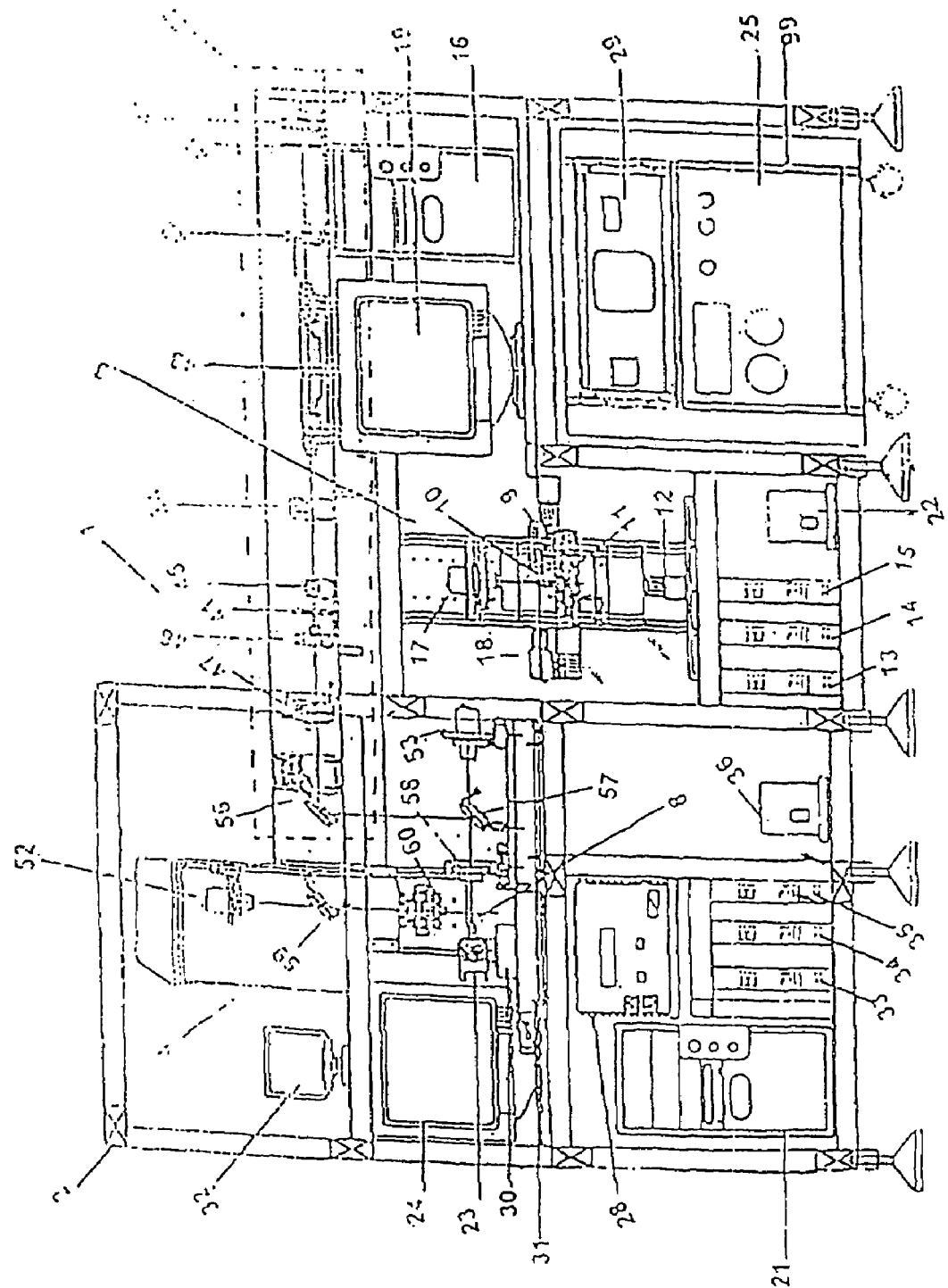
FIG. 1 represents a front view of a bruting machine according to an exemplary embodiment of the present invention.
Figure 2:
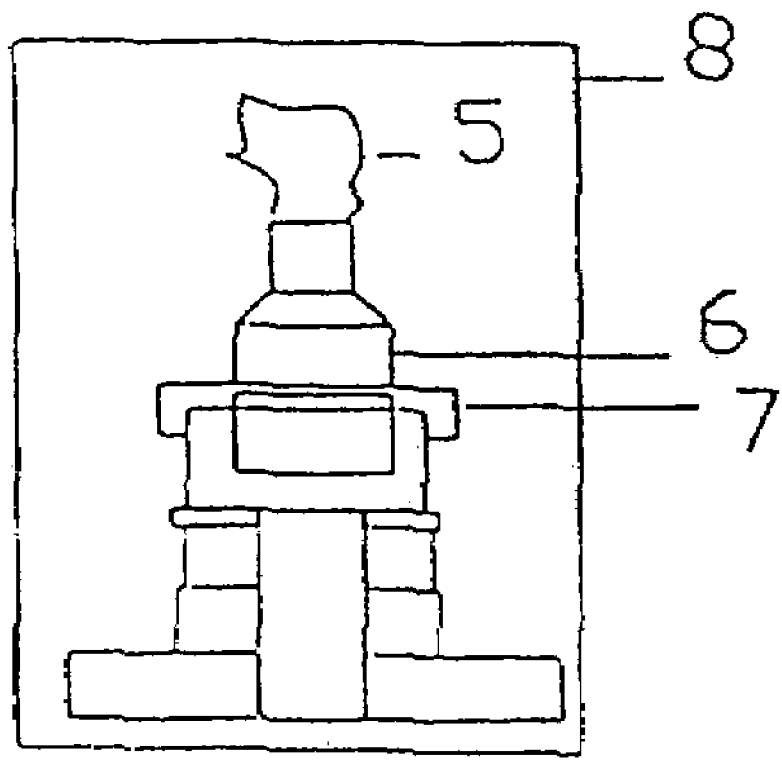
FIG. 2 represents a diamond holder.

A laser bruting machine according to exemplary embodiments of the present invention includes (i) a diamond holder 8, (ii) a setup device 3 and (iii) a processing device 4. The diamond holder 8 includes a stitching die 6, a magnetic die 7 and a rough diamond 5. The setup device 3 includes a computer numerical control (CNC) interface and a video system. The processing device 4 includes a CNC interface, a heat exchanger 25, a video system, a beam delivery mechanism 26, a laser source 27, an RF-Q switch driver 28, a power supply 29 and stabilizer 73.

A bruting machine 1 according to exemplary embodiments of the present invention is accommodated on an aluminum frame 2 and has three main sections.

A first main section is a diamond holder 8.

A second main section is a set up device 3.

A third main section is a processing device 4.

In the diamond holder 8, a rough diamond 5 to be processed for bruting or girdle polishing is stitched on top of the stitching die 6 by adhesive and heat. Due to magnetism of the magnetic die 7, the stitching die 6 is fixed on top of magnetic die 7. The combination of the stitching die 6 and the magnetic die 7 is referred to as the diamond holder 8.

An automated gemstone/rough diamond stone 5 centering and data management system is provided to the setup device 3. The physical data of a rough diamond stone/gemstone 5 is determined relative to the measured spectral response of light energy incident to a gemstone 5. A gemstone 5 is illuminated by a plurality of light sources such that the spectral response of the gemstone 5 is captured as a pixel data set, gauged, quantified and recorded for future reference via charge-coupled device (CCD) cameras. A setup device 3 provides an imaging station for the automated centering and quantifying physical data of gemstone 5. The video system/imaging station is linked to a computer/analysis station for communicating captured incident light data sets thereto. The analysis station/computer 16 employs a data processor and model database for assessing the physical data of the gemstone 5 by way of the communicated pixel data sets. The spectral response of a gemstone 5 to the incident light sources is quantified relative to model pixel data sets of the database and recorded for future reference therein. The operation of the setup device 3 is controlled by a control and instruction set.

The data processor/control card of the analysis station/computer 16 provides an instruction set for facilitating communication with the setup device 3 and analyzing the communicated pixel sets. The instruction set includes analytical and statistical image models, which extract pertinent physical data of gemstone from the pixel data sets. Additionally, the analysis station includes mass storage memory devices for storing the reference value database; analysis instruction sets, and report information, which may include text as well as visual data. The physical data of the gemstone 5 are communicated from the setup device 3 to the computer 21 of processing device 4 by, for example, means of a local area network (LAN).

The control data processor/control card of the setup device 3 and processing device 4 provides an instruction set for automating the steps necessary to precisely position and operate the imaging hardware. The imaging system/video system of the set up device 3 and the processing device 4 extract consistently and accurately, the size, shape, and proportion information from the images of a gemstone 5 using the data processing instruction set.

The setup device 3 includes a CNC interface and a video system.

The CNC interface of the setup device 3 includes a motorized X axis positioner 9, a motorized rotatable platform 11, a motorized up and down positioner 12, drive cards 13,14,15, control card, a computer 16 and stepper motors.

The video system of setup device 3 includes an upper CCD camera 17 and a lower CCD camera 18.

For accurate girdling/rounding or to remove surrounding excess surfaces of a rough diamond/gemstone 5 it is essential that the rough diamond/gemstone 5 should have a rotating/circular motion around its center point. The rough diamond/gemstone 5, along with the stitching die 6, should be placed in the center of the top of the magnetic die 7, and it is preferably done by CNC interface with the computer 16 with standard software and a monitor 19.

Example

Because of the video system, the rough diamond 5 appears on the monitor 19. As the upper CCD camera 17 and the lower CCD camera 18 are being used, one has the option for watching rough diamond 5 either in elevation or plan view. Supposing a surface of the rough diamond 5 is being selected by a 3-point method considering the top view/plan view of the rough diamond 5. Then by mouse clicking, three random end points of the rough diamond 5 are selected and with standard software it gives physical data of the rough diamond 5 and also puts stitching die 6 in the center of the top of the magnetic die 7 automatically using a pusher rod 10 of the motorized X axis positioner 9 and the motorized rotatable platform 11. The physical data of the rough diamond 5 and the predicted finished diamond 20 may be accessed in the processing device 4 as computers 16 and 21 of the setup device 3 and the processing device 4, respectively, are connected with the LAN. Functioning of the CNC Interface of the Setup Device 3:

Example

Referring to FIG. 16*a*, assuming that the center of the rough diamond 5 is P(x,y) and thus it is offset from O(0,0). It vertically represents the initial position of the rough diamond 5 placed on the motorized rotatable platform 11.

Referring to FIG. 16*b*, the computerized vision system will measure the angle to rotate and by rotary motion, the center P of the rough diamond 5 is brought onto the X axis by the motorized rotatable platform 11. The stepper motor drives the motorized rotatable platform 11 and hence diamond holder 8, which is placed on the motorized rotatable platform 11, also rotates and takes the position on the X-axis.

Referring to FIG. 16*c*, to match the center P with O, pusher rod 10, which is fixed with the motorized X axis positioner 9, pushes P towards O and hence stitching die 6 is placed in the center of the top of the magnetic die 7. The motorized X axis positioner 9 is driven by a stepper motor.

If elevation views or plan views of the rough diamond 5 do not appear clearly on the monitor 19, then the motorized up/down positioner 12 comes into action to give a clear image of rough diamond 5 on the monitor 19 by moving vertically. The motorized up/down positioner 12 is driven by a stepper motor.

Drive cards 13,14 and 15 are connected to the motorized X-axis positioner 9, the motorized up/down positioner 12 and the motorized rotatable platform 11, respectively. Drive cards 13, 14, and 15 are also connected with the computer 16. Drive cards 13, 14, and 15 amplify the electronic signal coming from computer 16 and provide amplified electronic signals to the motorized X axis positioner 9, the motorized up/down positioner 12, and the motorized rotatable platform 11. A control card, which is placed in the computer 16, controls the movement of the motorized X axis positioner 9, the motorized up/down positioner 12 and the motorized rotatable platform 11. Also, limit switches are provided to each end of the motorized X axis positioner 9, the motorized rotatable platform 11 and the motorized up/down positioner 12 to sense the home & end positions. To switch on or off the drive cards 13, 14, and 15, a drive card power supply 22 is connected to the drive cards 13, 14, and 15.

Processing Device 4:

The diamond holder 8 is carried to the processing device 4 following the process of centering the stitching die 6 on the magnetic die 7. The diamond holder 8 is fixed horizontally on the motorized rotatable platform 23. As the computer 16 of the setup device 3 and the computer 21 of the processing device 4 are connected via the LAN and hence physical data of the rough diamond 5 taken from the setup device 3 is accessed on monitor 24 through standard software installed in computer 21 of processing device 4.

Mechanism of Processing Device 4:

The processing device 4 includes a CNC interface, a heat exchanger 25, a video system, a beam delivery mechanism 26, a laser source 27, a radio frequency (RF)-Q switch driver 28 and a power supply 29.

The CNC interface of the processing device 4 includes a motorized Y-axis positioner 30, a motorized rotatable platform, a motorized X axis positioner 31, a computer 21, a monitor 24, a CCTV 32, drive cards 33, 34, and 35, a drive card power supply 36 and stepper motors to drive the motorized Y-axis positioner 30, the motorized rotatable platform 23 and the motorized X axis positioner 31.

The heat exchanger 25 includes a cooling system 37, a chilling system 38, and an interlock system 39. The cooling system 37 is associated with de-ionized water circulation from the cooling system 37 to the laser head 43 and the Q-switch 42 and vice versa. The chilling system 38 is associated with water circulation from the heat exchanger 25 to the chilling pump system 48 and vice versa. The chilling pump system 48 includes a chilling water tank 70 and a split tank 71. The heat exchanger 25 is connected to the power supply 29 via interlock cable. The interlock system 39 saves the machine from getting damaged by switching off the power supply 29 automatically if (i) flow and/or (ii) level and/or (iii) temperature of the de-ionized water unnecessarily decreases or increases. The interlock system 39 of the heat exchanger 25 includes a flow light emitting diode (LED) 49, a level LED 50 and a temperature LED 51.

The video system of the processing device 4 includes an upper CCD camera 52 and a lower CCD camera 53.

The beam delivery mechanism 26 of the processing device 4 includes (i) a bruting process system 54 and (ii) a girdle polishing system 55. The bruting process system 54 includes (a) a sliding beam bender 56, (b) a lower beam bender 57, and (c) a lower focusing device 58. The girdle polishing system 55 includes (a) an upper beam bender 59, and (b) an upper focusing device 60. The sliding beam bender 56, the lower beam bender 57 and the upper beam bender 59 are placed at approximately a 45 degree angle with respect to incoming laser beams. The lower focusing device 58 and the upper focusing device 60 have illuminating sources to illuminate the rough diamond 5. Each illuminating source has a plurality of LED's.

The laser source 27 includes a back mirror 40, apertures 41, a Q-switch 42, a laser head 43, a shutter 44, a polarizer 45, a front mirror 46 and a beam expander 47.

The laser head 43 is the crucial part to generating the laser light. The front mirror 46 and the back mirror 40 amplify the laser light by providing feedback. The Q-switch 42 is used to store the laser light energy to emit as a burst of high peak power. The safety shutter 44 blocks the laser beam in case of electrical failure. The safety shutter terminates the laser by blocking the laser beam path and preventing emission of laser radiation out of the laser source. The safety shutter 44 is actuated by a toggle switch. The apertures 41 restrict the light amplification along the off-axis of the resonator to provide a sharp frequency band. The beam expander 47 expands the laser beam to minimize its divergence. A laser beam polarizer 45 is used to polarize the laser beam.

To get the pulsed laser output with high peak power, the laser is operated in Q-switch mode. The transducer in acoustic-optic Q-switch 42 requires RF power for operation of the Q-switch 42 and such requirement is fulfilled by the RF-Q switch driver 28. The RF source is pulsed at frequencies from 0.1 KHz to 50 KHz corresponding to the desired pulse repetition rate of the laser. The quartz cell being switched with such a high frequency needs cooling. Therefore the Q-switch 42 also becomes cool. To operate Q-switch 42 in pulsed mode, the RF-Q switch driver 28 is connected to the Q-Switch 42 and the computer 21. The computer 21 sends the frequency data to the RF-Q switch driver 28 and, accordingly, the laser in the laser source is operated in the Q-switch mode. As the Q-switch 42 is being switched with such a high frequency, it is cooled by circulation of de-ionized water for repetitive operations and therefore the interlock system is provided.

The power supply 29 ignites and controls the intensity of the laser light emitted by the laser lamp (preferably a Kr/Xe arc lamp). The intensity of the light produced by the lamp is used for pumping the Nd atoms in a Nd:YAG rod. Once the discharge in the lamp is produced, then by changing the current flowing through the lamp, the intensity of the light emitted by the lamp may be controlled. In many applications, the laser is not used continuously and therefore the power supply 29 is provided with a special feature of a standby mode, which keeps alive the discharge in the lamp by producing the optimum current required for the lamp to maintain the discharge in the lamp. This particular arrangement is very useful in increasing the operational life of the lamp and also that of the power supply, which saves the whole process of generating the trigger pulse for igniting the lamp.

Figure 3:
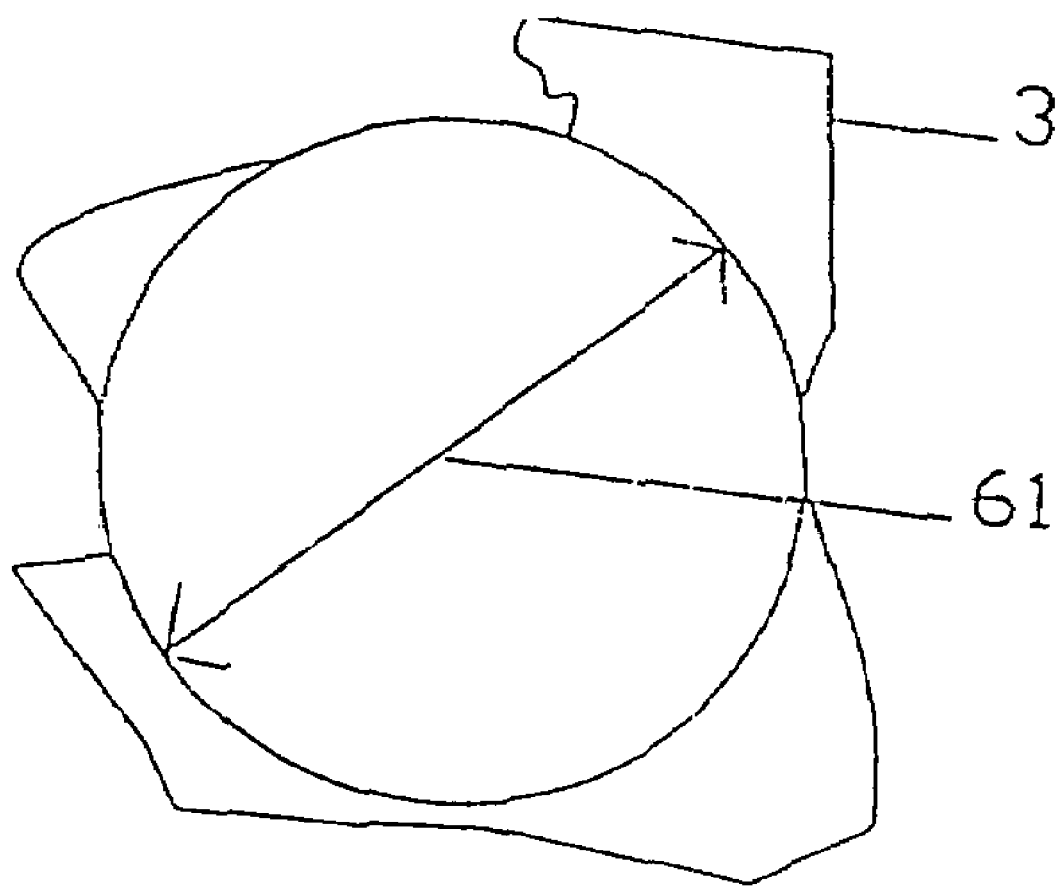
FIG. 3 represents a top view of a rough diamond with a possible maximum diameter
Figure 4:
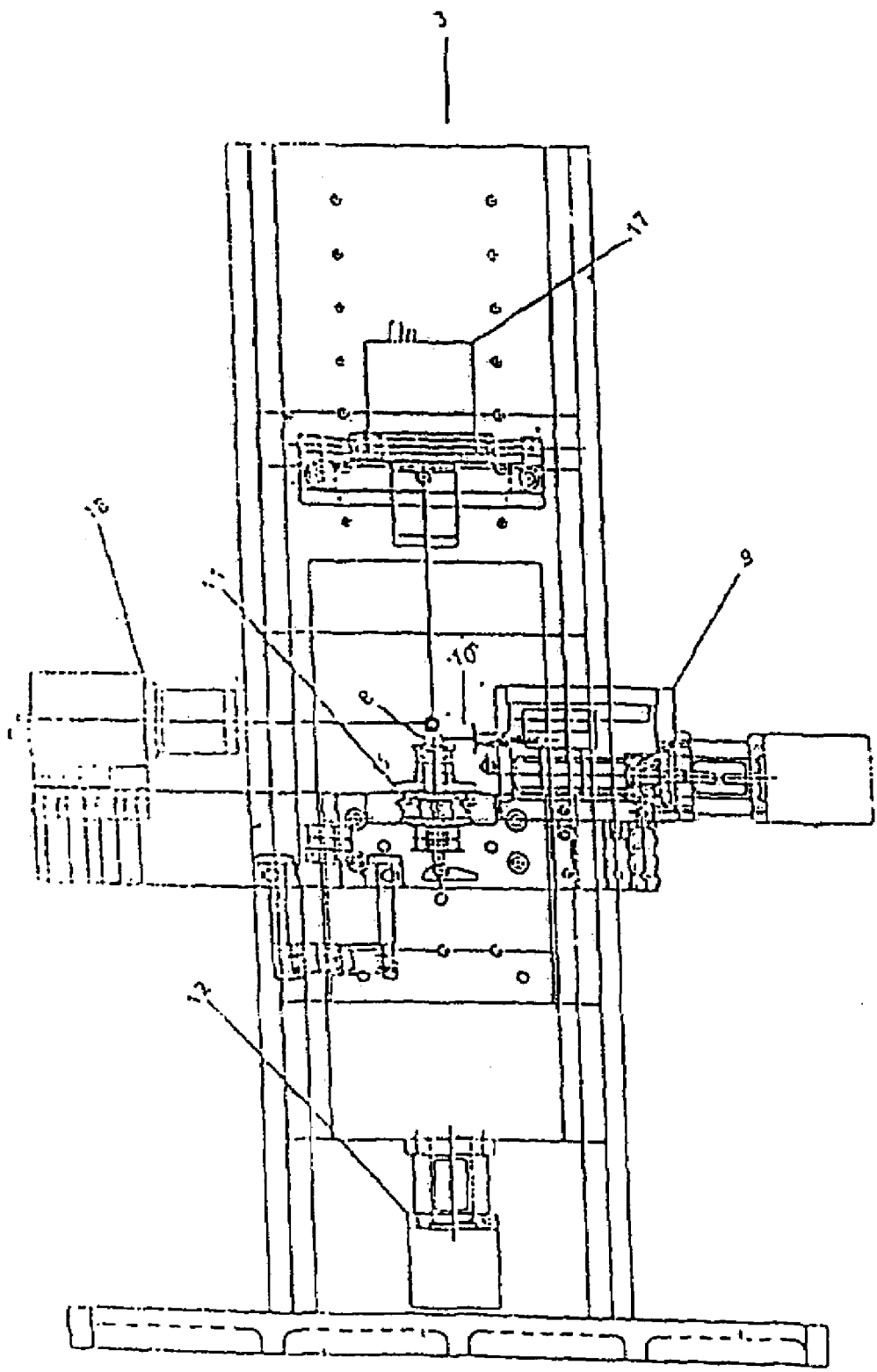
FIG. 4 represents a front view of a setup device.
Figure 5:
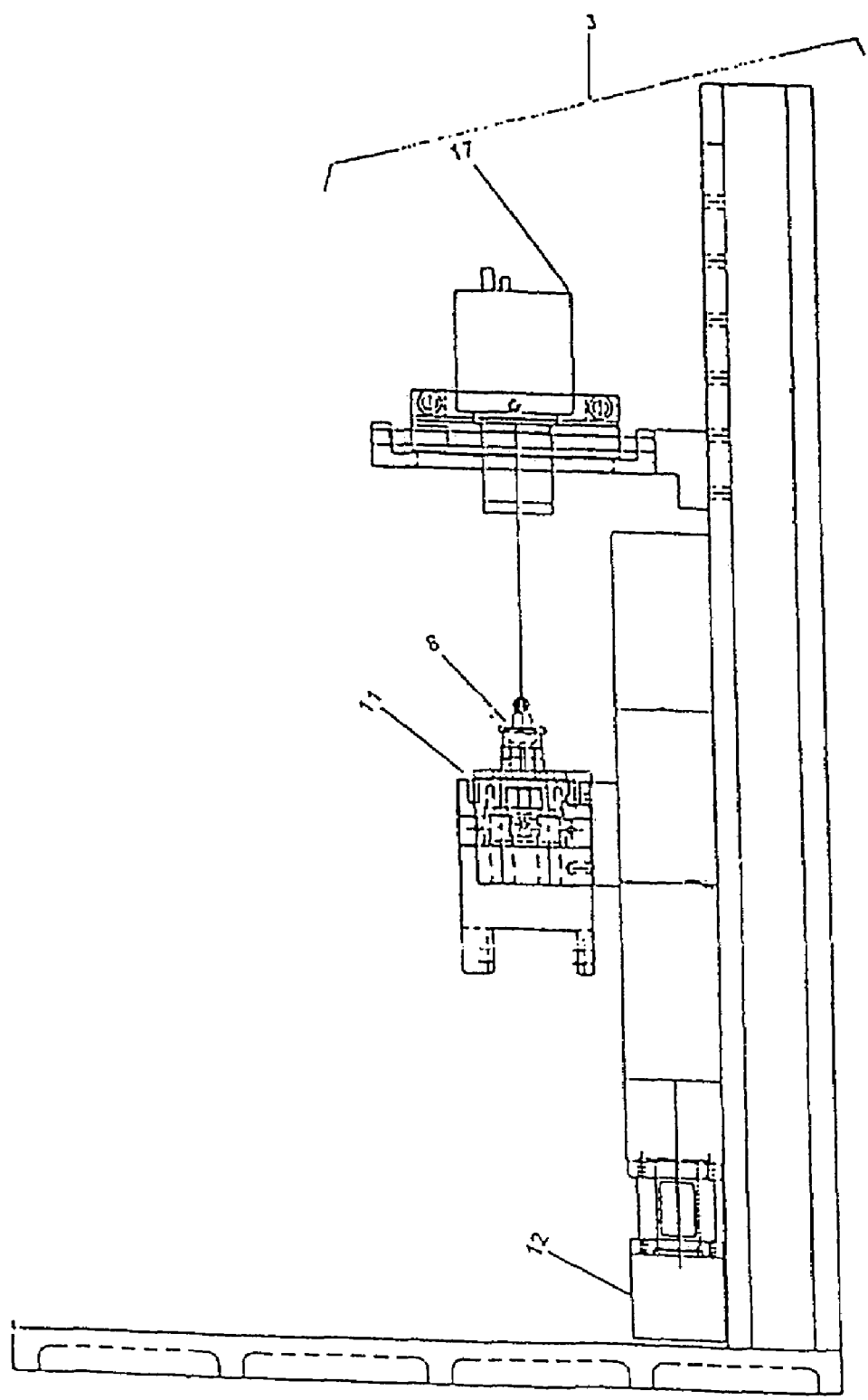
FIG. 5 represents a side view of the setup device of FIG. 4.
Figure 6:
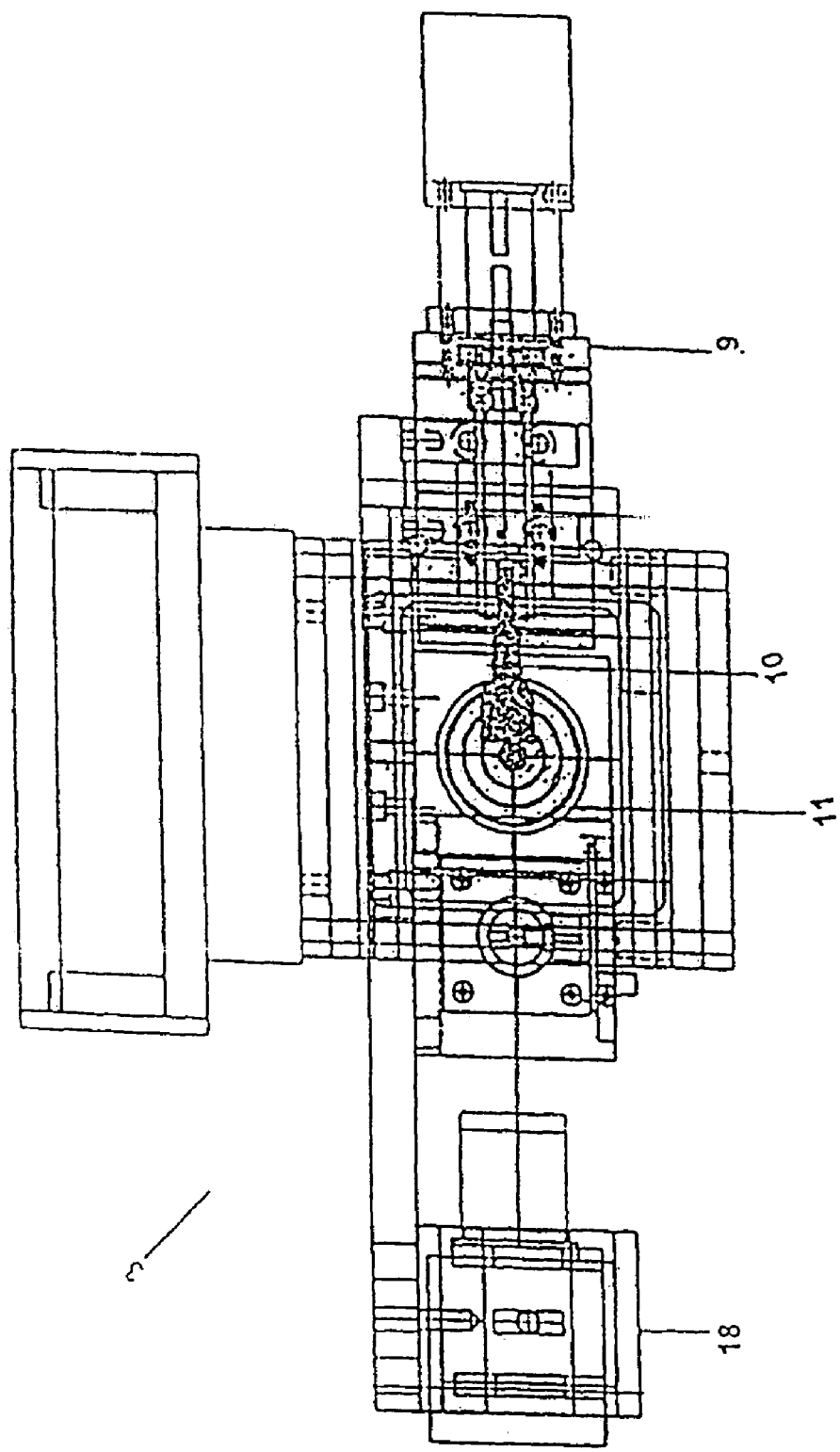
FIG. 6 represents a top view of the setup device of FIG. 4.
Figure 7:
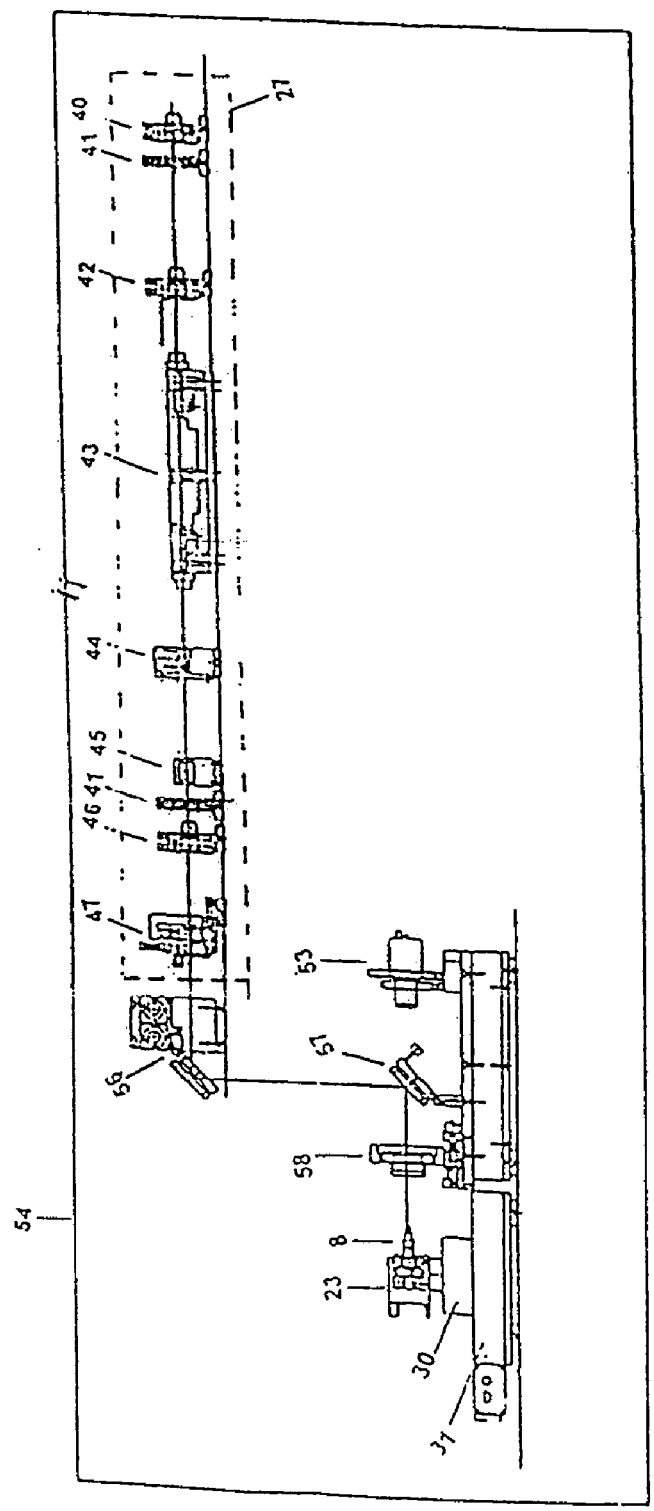
FIG. 7 represents a front view of a bruting processing system.
Figure 8:
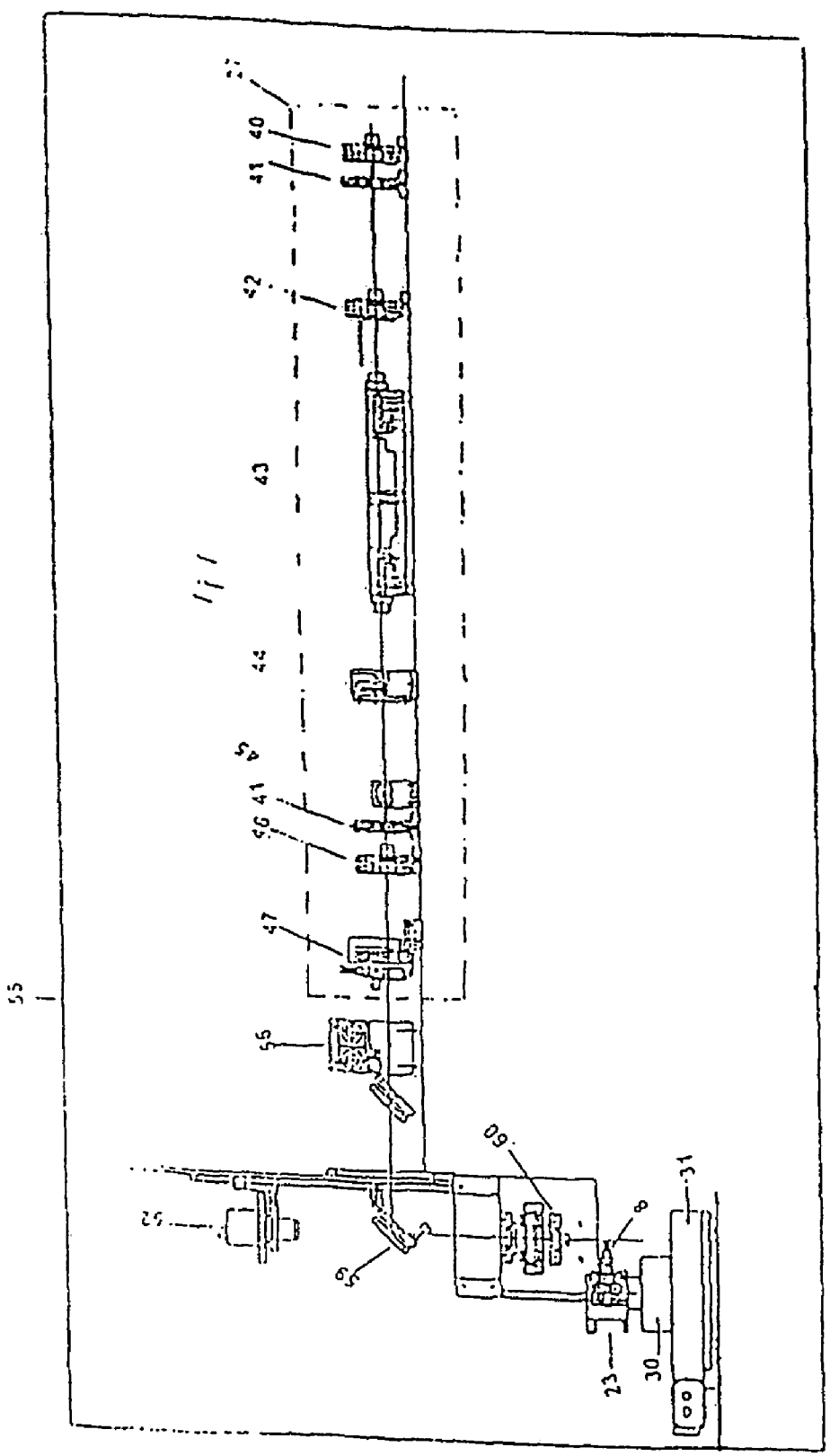
FIG. 8 represents a front view of a girdle polishing system.
Figure 9:
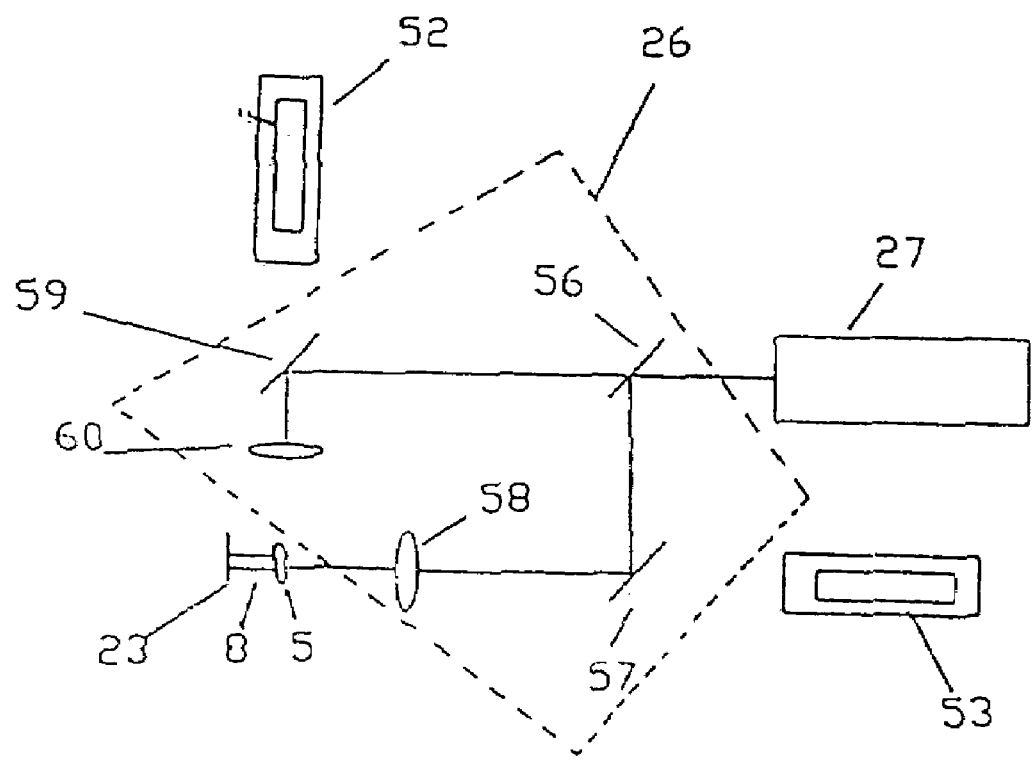
FIG. 9 represents a block diagram of a beam delivery mechanism.
Figure 10:
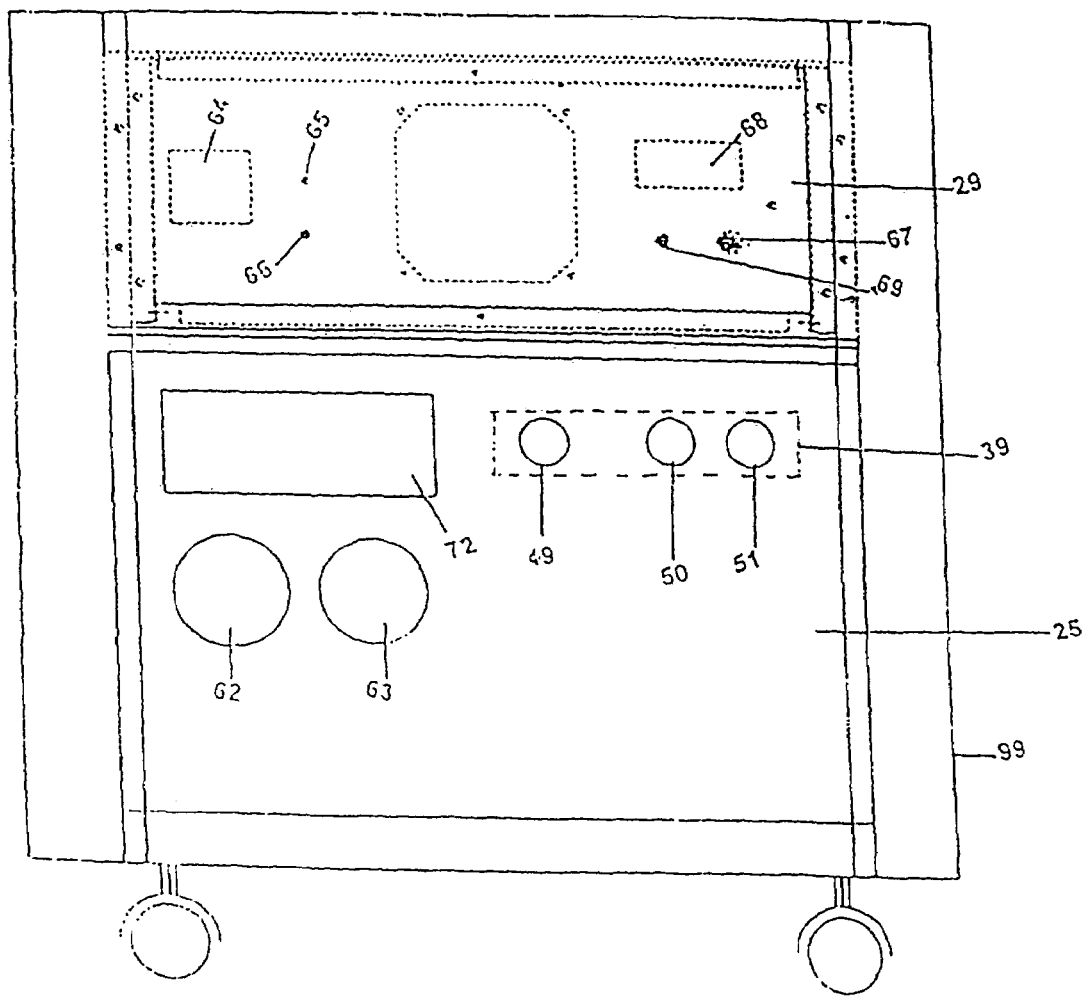
FIG. 10 represents a trolley containing a power supply and heat exchanger.
Figure 11:
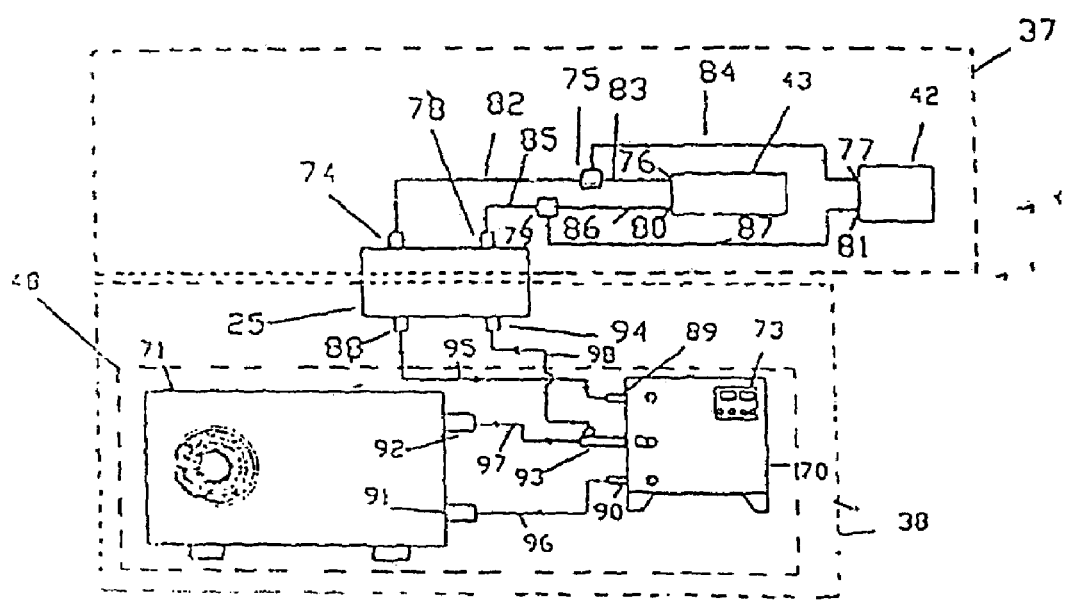
FIG. 11 represents a block diagram of a cooling system and a chilling system of the heat exchanger.
Figure 12:
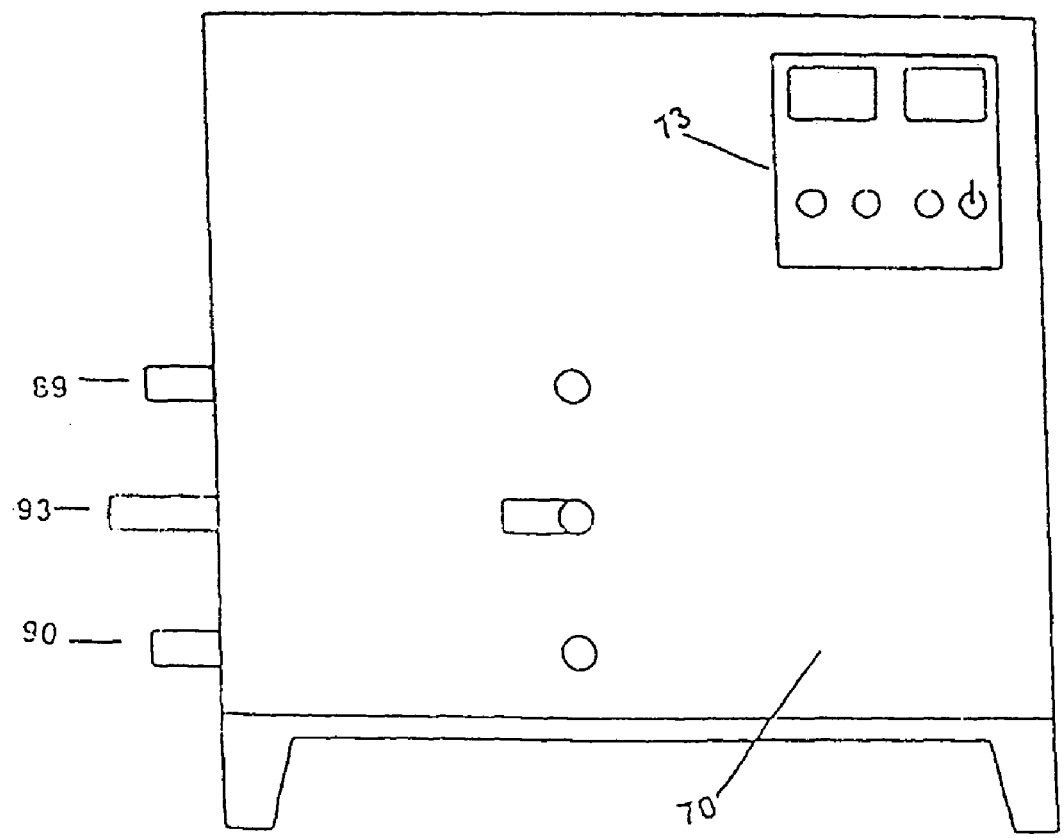
FIG. 12 represents a front view of a chilling water tank.
Figure 13:
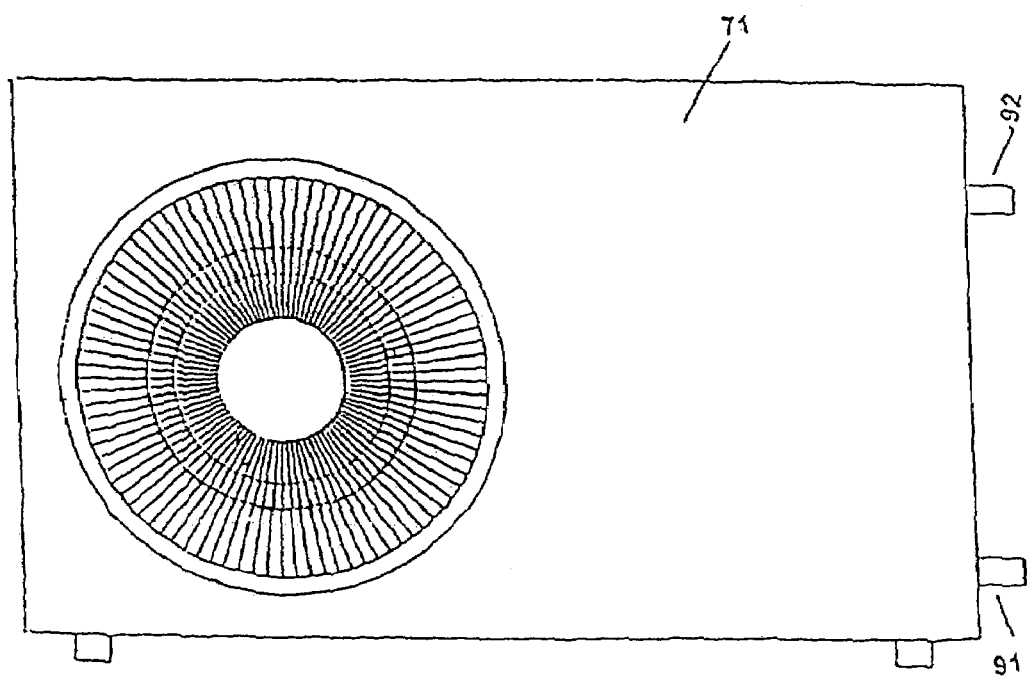
FIG. 13 represents a front view of a split tank.
Figure 14:
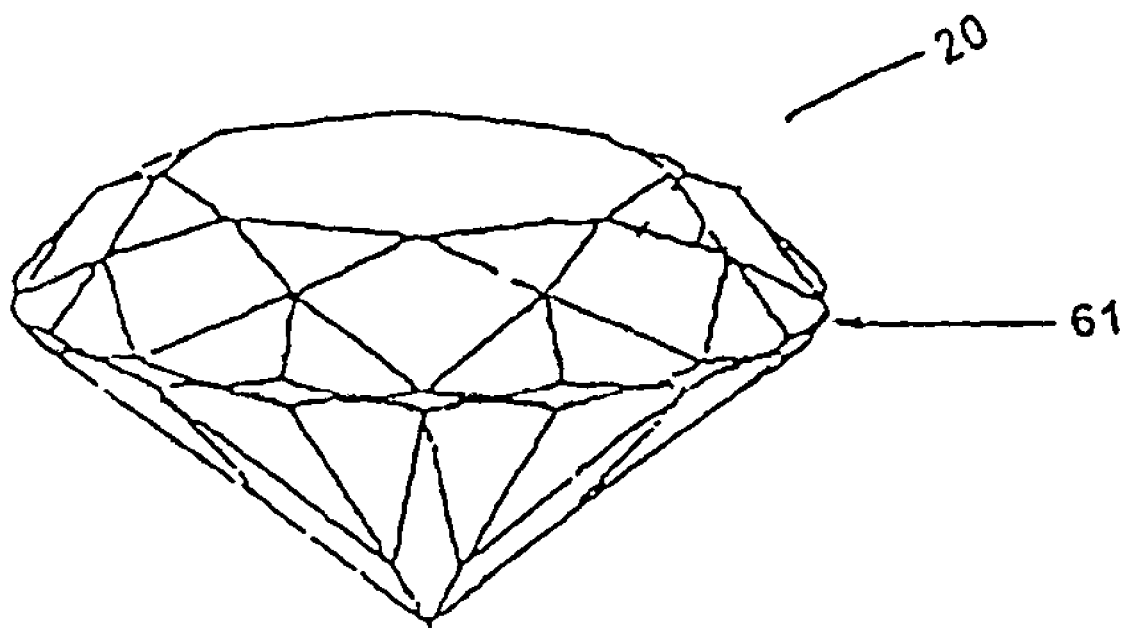
FIG. 14 represents a diamond
Figure 15:
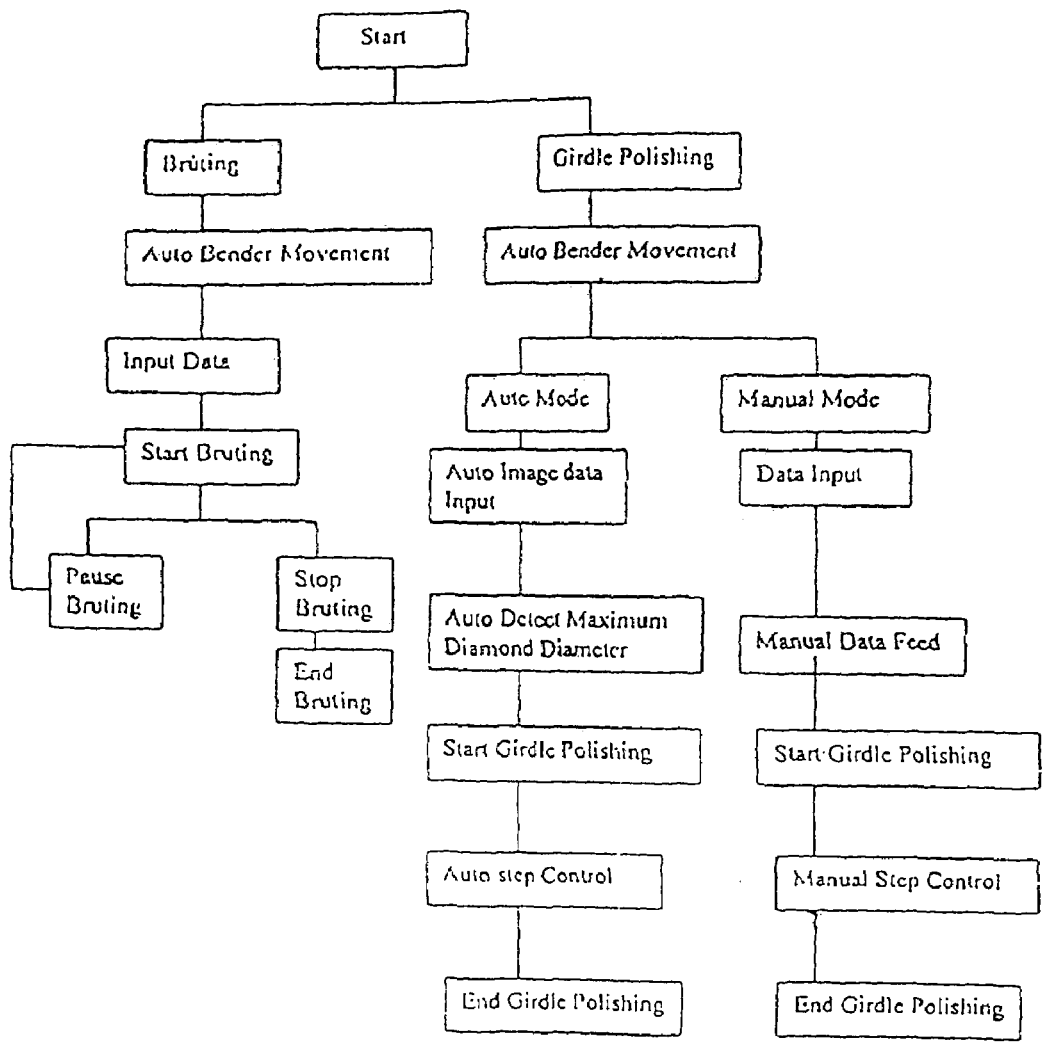
FIG. 15 represents a flow chart.

Function of the Processing Device 4:

A diamond holder 8, which includes the stitching die 6 and the magnetic die 7, is carried from the setup device 3 and fixed horizontally to the motorized rotatable platform 23. In the bruting process, the laser beam coming from the laser source 27 falls on the sliding beam bender 56 from which it falls on lower beam bender 57 and, hence, the laser beam coming from the lower beam bender 57, which is then focused by the lower focusing device 58, and finally the focused laser beam falls on the gemstone/rough diamond stone 5. Therefore, the maximum diameter 61 (FIG. 3) of the rough diamond stone/gemstone 5 is achieved by removing excess surface from it by rotary motion and displacement on a particular axis.

Also, the maximum diameter 61 of the rough diamond 5 is achieved with the girdle polishing process. In the girdle polishing process, the laser beam coming from laser source 27 falls on upper beam bender 59, thereby bypassing the sliding beam bender 56. A laser beam coming from upper beam bender 59, which is then focused by the upper focusing device 60, and hence focused laser beam falls on rough diamond stone 5.

The application of the bruting process 54 or the girdle polishing process 55 is to obtain the maximum diameter 61 from a rough diamond 5 by removing excess surrounding surface from the rough diamond 5. After the bruting process 54 or the girdle polishing process 55, the shape of the rough diamond 5 is converted into a cylindrical shape in general. To remove excess surrounding surface of the rough diamond 5, the laser beam from the laser source 27 is used.

Procedure for Switching on the Heat Exchanger 25 and the Power Supply 29:

The pump on/off knob 62 is accommodated in the heat exchanger 25, which is kept "on" initially and the pump LED 63 is operated by the pump on/off knob 62. Also, a digital temperature controlling unit 72 and the interlock system 39 are provided to the heat exchanger 25. Then, inpower supply 29, test point (T.P.) 64 and the lamp 65, the switches are switched "on" to trigger the laser lamp of the laser source 27. Also, as the power supply 29 is connected with the heat exchanger 25 via the interlock cable and, therefore, the interlock LED 66 is provided on the power supply 29. The push button switch "push for control" 67 is pressed to start the current setting unit 68. The value displayed in the current setting unit 68 may be varied by the current variable knob 69. The current setting unit 68 is provided to have a desired wattage for cutting the surrounding excess surfaces of the rough diamond 5. The heat exchanger 25 and the power supply 29 are accommodated in the trolley 99.

Example

The required heat in the form of a laser beam to cut the surrounding excess surface of the rough diamond 5 depends on the diamond quality. Supposing that for a rough diamond 5 the required wattage to cut the surrounding excess surface is 25 watts and to have such a value the current variable knob 69 of the power supply 29 is allowed to move until 25 watts is achieved in the watt meter.

Application and Functioning of the Heat Exchanger 25:

A large quantity of heat is generated inside the pumping cavity of the laser source 27 when the laser is produced. If the heat is not removed from the pumping cavity of laser source 27, then it will cause lamps and rods to get damaged and therefore a proper arrangement of the heat distribution in terms of the heat exchanger 25 is provided to the processing device 4. The heat from de-ionized water is subsequently removed by the chilling system 38. The temperature of the de-ionized water is regulated by means of a solenoid, which turns outside water flow from the chilling system 38 on and off as required.

The heat exchanger 25 includes (i) a cooling system 37, (ii) a chilling system 38, and (iii) an interlock system 39. The cooling system 37 circulates de-ionized water from the heat exchanger 25 to the laser head 43 and the Q-Switch 42 and vice versa. Also, the chilling system 38 circulates water from the heat exchanger 25 to the chilling pump system and vice versa.

In the heat exchanger 25, water circulation from the chilling pump system 48 decreases the temperature of incoming de-ionized water at significant level and provides de-ionized water having less temperature to the laser head 43 and Q-switch 42. Flow of water from the chilling system 38 used for decreasing temperature of incoming de-ionized water from the cooling system 37 is heated and, hence, the temperature of such water increases. The temperature of such water is required to decrease by means of a chilling pump system 48. The chilling pump system 48 includes a split tank 71 and a chilling water tank 70.

Example

Assuming the display of the digital temperature controlling unit 72 of the heat exchanger 25 shows a temperature of de-ionized water as being 35 degrees celsius. Now, if it is required that the temperature of de-ionized water should be 30 degrees celsius then the SET switch of the digital temperature controlling unit 72 is pressed for a few seconds. When the present temperature of de-ionized water (35 degrees celsius) blinks, then the up/down push button switches are pressed until the required temperature of 30 degrees celsius is displayed on the display of the digital temperature controlling unit 72. The SET push button switch of digital temperature controlling unit 72 is pressed when 30 degrees celsius is displayed on the display of the digital temperature controlling unit 72. After a few moments, as the temperature of de-ionized water is set at 30 degrees celsius, the chilling pump system 48 of the heat exchanger 25 that decreases the temperature of incoming de-ionized water stops working, although the chilling pump system 48 continues to function.

Functioning of the Chilling Pump System 48 of the Heat Exchanger 25:

The digital temperature control unit 73 is provided to the chilling water tank 70. When in the display of the digital temperature control unit 73 the value of present water temperature is significantly higher than the value of set water temperature then the split tank 71 starts working, and if the value of present water temperature remains around the value of set water temperature then the split tank 71 stops working. In this way the chilling pump system 48 saves substantial power.

Hence, with the heat exchanger 25, the temperature may be maintained and the same saves the machine from becoming overheated.

The in port 74 of the heat exchanger 25 is connected to one end of a Teflon connector 75 via hose pipe 82 while the other two ends of the Teflon connector 75 are connected to the out port 76 of the laser head 43 and the out port 77 of the Q-switch 42 via hose pipes 83 and 84, respectively. The out port 78 of the heat exchanger 25 is connected to one end of the Teflon connector 79 via hose pipe 85 while the other two ends of the Teflon connector 79 are connected to the in port 80 of the laser head 43 and the in port 81 of the Q-switch 42 via hose pipes 86 and 87, respectively. The out port 78 of the heat exchanger 25 provides de-ionized water to the laser head 43 and the Q-switch 42 through the in port 80 and the in port 81, respectively, while due to laser heat warm de-ionized water comes out from the out port 76 and the out port 77 of the laser head 43 and the Q-switch 42, respectively, and enters into the heat exchanger 25 through the in Port 74.

The chilling out port 88 of the heat exchanger 25 is connected to the in port 89 of the chilling water tank 70 via hose pipe 95 and the out port 90 of the chilling water tank 70 is connected to the in port 91 of the split tank 71 via hosepipe 96. The out port 92 of the split tank 71 is connected to the dual port 93 of the chilling water tank 70 via hose pipe 97 and the other end of the dual port 93 of the chilling water tank 70 is connected to the chilling in port 94 of the heat exchanger 25 via hose pipe 98.

Water used to decrease the temperature of de-ionized water becomes warm and comes out from the chilling out port 88 of the heat exchanger 25 and travels toward the in port 89 of the chilling water tank 70. Then, this warm water travels into the split tank 71 and the split tank 71 decreases the temperature of warm water and provides such water to the chilling water tank 70 and from the chilling water tank water travels into the heat exchanger through the in port 94.

Functioning of the Beam Delivery Mechanism 26 of the Processing Device 4:

If the bruting process is selected on the monitor 24 through software installed in the computer 21, the laser beam falls on the sliding beam bender 56. Then the laser beam falls on the lower beam bender 57 from which it travels towards lower focusing device 58 and, hence, the focused laser beam falls on a side of a rough stone 5 accommodated on diamond holder 8.

If the girdle polishing process is selected on the monitor 24 through software installed on the computer 21, then the laser beam falls on the upper beam bender 59, thereby bypassing sliding beam bender 56. Now the laser beam passes through upper focusing device 60 and, hence, the focused laser beam falls on rough stone 5 accommodated on diamond holder 8.

Also, the upper focusing device 60 and the lower focusing device 58 have illuminating components to illuminate the rough diamond 5 by means of a plurality of surrounding LED's for watching the bruting process or the girdle polishing process on the CCTV 32.

Functioning of the CNC Interface of the Processing Device 4:

Motorized Rotatable Platform 23:

The surrounding excess surface of the rough diamond 5 is removed by a laser beam due to rotation of the motorized rotatable platform 23 on which the diamond holder 8 is mounted horizontally. To drive the motorized rotatable platform 23, a stepper motor is used.

Motorized Y-Axis Positioner 30 and Motorized X-Axis Positioner 31:

During the bruting process, the laser beam dips into the rough diamond 5 gradually until the maximum diameter 61 or cylindrical shape of the diamond is achieved for which displacement of the rough diamond 5 through the motorized rotatable platform 23 on Y-axis and/or X-axis is required, which is accomplished by the motorized Y-axis positioner 30 and/or motorized X-axis positioner 31. The motorized Y-axis positioner 30 is mounted on the motorized X-axis positioner 31 in such a way that the motorized Y-axis positioner 30 travels on the motorized X-axis positioner 31. Displacement of the motorized X-axis positioner 31 and/or the motorized Y-axis positioner 30 is done automatically or by manual data fed through software installed on the computer 21.

The movement of the motorized Y-axis positioner 30, the motorized X-axis positioner 31, and the rotation of the motorized rotatable platform 23 are controlled by control cards installed in the computer 21.

As the Y-drive card 33 is connected to the computer 21 and the motorized Y-axis positioner 30, it amplifies the electronic signal coming from the computer 21 and sends the amplified signal to the motorized Y-axis positioner 30. Similarly, the X-drive card 34 and the R-drive card 35 send amplified electronic signals to the motorized X-axis positioner 31 and the motorized Rotatable platform 23, respectively. The Y-drive card 33, the X-drive card 34 and the R-drive card b may be switched on/off through the drive card power supply 36 connected to them. The motorized Y-axis positioner 30 and the motorized X-axis positioner 31 are driven by stepper motors. Also, limit switches are provided to each end of the motorized Y axis positioner 30, the motorized X axis positioner 31 and the motorized rotatable platform 23 to sense the home and end positions.

A rough diamond 5 to be processed for bruting or girdle polishing may be watched on CCTV 32 through the video system of the processing device 4, which includes the upper CCD camera 52 and the lower CCD camera 53.

Also, because the laser bruting is a non-contact process, it provides more speed, reduces weight loss significantly and keeps the shape of the diamond substantially uniform. In the laser bruting machine according to exemplary embodiments of the present invention, the computer becomes an important element in cutting of the diamond/gemstone. With the standard software, the computer suggests an optimal cut to have an accurate rounded shape of the diamond in which dimensions and shapes are taken into account. Also, the rough-diamond stone to be centered and bruted is lit up by illuminating sources and these illuminating sources include a plurality of LED's so the eye gets the impression that is always the same side of the stone that is lit and hence the illuminated rough diamond may be watched on the CCTV through the video system, which includes the CCD cameras. This is a useful technique, because the bruting machine according to exemplary embodiments of the present invention may check the process at all times without stopping the machine and the same may be operated by a single person. Summing up all the advantages, productivity increases significantly by using the laser bruting machine according to exemplary embodiments of the present invention.

While advantageous embodiments have been chosen to illustrate the invention, it will be understood by those skilled in the art that various changes and modifications may be made therein without departing from the scope of the invention as defined in the appended claims.

The invention claimed is:

1. A laser bruting machine, comprising:
   a diamond holder;
   a setup device and a processing device, each being adapted to receive the diamond holder;
   the diamond holder including a rough diamond, a stitching die adapted to receive the rough diamond, and a magnetic die adapted to receive the stitching die;
   the setup device centers the rough diamond and the stitching die on the magnetic die with a computer numerical control (CNC) interface and a video system; and
   the processing device cuts the rough diamond and includes a CNC interface to position the rough diamond, a heat exchanger to control temperature of the processing device, a video system to view operation of the processing device, a beam delivery mechanism to deliver a laser beam to the rough diamond, a laser source to generate the laser beam, a radio frequency (RF)-Q Switch driver to control operation of the laser source, a power supply and a stabilizer to control operation of the heat exchanger.

2. A laser bruting machine as claimed in claim 1, wherein a rough diamond is stitched on top of the stitching die by adhesive and heat; and
the stitching die and the rough diamond are fixed on top of the magnetic die.

3. A laser bruting machine as claimed in claim 1, wherein the CNC interface of the setup device includes
   a motorized X axis positioner, a motorized rotatable platform, and a motorized up and down positioner to move the diamond holder received by the setup device;
   drive cards to drive the motorized X axis positioner, the motorized rotatable platform and the motorized up and down positioner;
   a control card to control movement provided by the drive cards;
   a computer in which the control card is disposed;
   a monitor connected to the computer;
   limit switches to sense home and end positions of the motorized X axis positioner, the motorized rotatable platform and the motorized up and down positioner; and
   a drive card power supply to supply power to the drive cards of the setup device.

4. A laser bruting machine as claimed in claim 3, wherein each of the motorized X axis positioner, the motorized rotatable platform, and the motorized up and down positioner is driven by a stepper motors; and
the diamond holder is rotated by the motorized rotatable platform and takes a position on the X axis.

5. A laser bruting machine as claimed in claim 4, wherein one end of each of the drive cards is connected to the motorized X-axis positioner, the motorized up and down positioner and the motorized rotatable platform, respectively, and the other end of each of the drive cards is connected to the drive card of the computer through a pin connector.

6. A laser bruting machine as claimed in claim 5, wherein motion of the motorized X axis positioner, the motorized rotatable platform, and the motorized up and down positioner is controlled by the control card disposed in the computer.

7. A laser bruting machine as claimed in claim 1, wherein the video system of the setup device is connected to the computer and has an upper charge-coupled device (CCD) camera and a lower CCD camera, both cameras being connected to the computer.

8. A laser bruting machine as claimed in claim 3, wherein the CNC interface of the processing device includes
- a motorized Y-axis positioner, a motorized rotatable platform, and a motorized X axis positioner to move the diamond holder received by the processing device;
- a computer in which control cards are disposed;
- a monitor connected to the computer;
- a closed circuit television (CCTV) connected to the computer;
- a Y drive card, an X drive card, and an R drive card to drive the motorized Y-axis positioner, the motorized rotatable platform, and the motorized X axis positioner;
- a drive card power supply to supply power to the drive cards of the processing device; and
- three stepper motors to supply power to the motorized Y-axis positioner, the motorized rotatable platform, and the motorized X axis positioner.

9. A laser bruting machine as claimed in claim 8, wherein the motorized Y-axis positioner, the motorized rotatable platform, and the motorized X axis positioner are driven by the stepper motors and controlled by the computer.

10. A laser bruting machine as claimed in claim 9, wherein one end of the Y drive card, the R drive card and the X drive card 34 are connected to the motorized Y-axis positioner, the motorized rotatable platform and the motorized X axis positioner, respectively;
the other end of the Y drive card, the R drive card, the X drive card are connected to the control card of the computer through a pin connector; and
the Y-drive card, the X drive card, and the R drive card are connected to the drive card power supply.

11. A laser bruting machine as claimed in claim 8, wherein motion of the motorized Y-axis positioner, the motorized rotatable platform, and the motorized X axis positioner are controlled by the control card of the computer.

12. A laser bruting machine as claimed in claim 8, wherein displacement of the rough diamond of the diamond holder via the motorized rotatable platform on the Y-axis and the X-axis is accomplished by the motorized Y-axis positioner and the motorized X-axis positioner, respectively, the motorized Y-axis positioner and the motorized X-axis positioner being mounted such that the motorized Y-axis positioner travels on the motorized X-axis positioner.

13. A laser bruting machine as claimed in claim 8, wherein limit switches are provided to each end of the motorized Y axis positioner, the motorized X axis positioner and the motorized rotatable platform to sense the home and end positions.

14. A laser bruting machine as claimed in claim 1, wherein the video system of the processing device is connected to the computer and has an upper charge-coupled device (CCD) camera and a lower CCD camera, both cameras being connected to the computer.

15. A laser bruting machine as claimed in claim 1, wherein the heat exchanger of the processing device is connected to the power supply of the processing device and to the RF Q-switch drive;
the digital temperature controller and light emitting diodes (LED's) of an interlock controller for flow, level and temperature indication of de-ionized water, the pump on and off knob, and the pump LED are accommodated in the heat exchanger.

16. A laser bruting machine as claimed in claim 15, wherein
the heat exchanger has a cooling system and a chilling system, the cooling system circulates de-ionized water while the chilling system circulates water;
the cooling system in port of the heat exchanger is connected to one end of a Teflon connector via hose pipe while the other two ends of the Teflon connector are connected to an out port of a laser head and an out port of a Q-switch via hose pipes, respectively;
an out port of the heat exchanger is connected to one end of the Teflon connector via the hose pipe while the other two ends of the Teflon connector are connected to an in port of the laser head and an in port of the Q-switch via hose pipes respectively;
the chilling system has a chilling pump system, the chilling pump system having a split tank and a chilling water tank;
the digital temperature controller is connected to the chilling water tank;
the chilling out port and the chilling in port of the heat exchanger are connected to the chilling pump system;
the chilling out port of the heat exchanger is connected to an in port of the chilling water tank via hose pipe and an out port of the chilling water tank is connected to an in port of the split tank via a hosepipe;
an out port of the split tank is connected to a dual port of the chilling water tank via hose pipe and the other end of the dual port of the chilling water tank is connected to the chilling in port of the heat exchanger via hose pipe.

17. A laser bruting machine as claimed in claim 1, wherein a beam delivery mechanism of the processing device has a bruting process system and a girdle polishing system;
the bruting process system includes
- a sliding beam bender;
- a lower beam bender receiving the laser beam from the sliding beam bender; and
- a lower focusing device that receives the laser beam from the lower beam bender and focuses the laser beam on the diamond; and the girdle polishing system includes
- an upper beam bender; and
- an upper focusing device that receives the laser beam from the upper beam bender and focuses the laser beam on the diamond.

18. A laser bruting machine as claimed in claim 17, wherein
the sliding beam bender, the lower beam bender and the upper beam bender are placed at substantially 45° with respect to the incoming laser beam, each of the beam benders bends the laser beam substantially 90°;
the lower focusing device and the upper focusing device focuses the incoming laser beam; and
the lower focusing device and the upper focusing device have an illuminating source to illuminate the rough diamond, each illuminating source of the lower focusing device and the upper focusing device has a plurality of light emitting diodes (LED's).

19. A laser bruting machine as claimed in claim 1, wherein the laser source includes
- a laser head to generate a laser beam;
- a back mirror to amplify the laser beam by providing feedback;
- apertures to restrict light amplification;
- a Q-switch to store laser beam energy;
- a shutter to block the laser beam path;

a polarizer to polarize the laser beam;

a front mirror to amplify the laser beam by providing feedback; and a beam expander to minimize divergence of the laser beam.

20. A laser bruting machine as claimed in claim 1, wherein the RF Q Switch driver is connected to the computer, the Q-Switch and the heat exchanger.

21. A laser bruting machine as claimed in claim 1, wherein the stabilizer is connected to the power supply; and a test point switch, a laser lamp on and off toggle switch, a current setting unit, a push button on and off switch of the current setting unit, and a current variable knob are connected to the power supply.

22. A laser bruting machine as claimed in claim 8, wherein the computers are connected by a local area network.

23. A laser bruting machine as claimed in claim 3, wherein the limit switches are provided to each end of the motorized X-axis positioner, the motorized rotatable platform, the motorized up and down positioner to sense home and end positions.

24. A laser bruting machine as claimed in claim 3, wherein the drive card power supply is connected to the drive cards to switch on and off the drive cards.

* * * * *